United States Patent
Kitoh

(10) Patent No.: US 6,258,485 B1
(45) Date of Patent: Jul. 10, 2001

(54) LITHIUM SECONDARY BATTERY

(75) Inventor: Kenshin Kitoh, Nagoya (JP)

(73) Assignee: NGK Insulators, LTD, Nagoya (JP)

( * ) Notice: Subject to any disclaimer, the term of this patent is extended or adjusted under 35 U.S.C. 154(b) by 0 days.

(21) Appl. No.: 09/349,286

(22) Filed: Jul. 7, 1999

(30) Foreign Application Priority Data

Jul. 14, 1998 (JP) .................................................. 10-199093

(51) Int. Cl.$^7$ .............................. H01M 4/58; H01M 4/00; H01M 4/02; H01M 4/64
(52) U.S. Cl. ...................... 429/231.95; 429/94; 429/211; 429/231.4; 429/233
(58) Field of Search ..................... 429/231.95, 231.4, 429/211, 94, 233

(56) References Cited

U.S. PATENT DOCUMENTS

| | | | |
|---|---|---|---|
| 4,293,396 | * 10/1981 | Allen et al. ............................ | 204/106 |
| 4,298,666 | * 11/1981 | Taskier .................................. | 429/206 |
| 5,486,215 | 1/1996 | Kelm et al. . | |
| 5,582,936 | * 12/1996 | Mrotek et al. ......................... | 429/241 |
| 5,849,431 | * 12/1998 | Kita et al. .............................. | 429/164 |
| 5,958,625 | * 9/1999 | Rao ........................................ | 429/241 |
| 5,972,532 | * 10/1999 | Oweis et al. ............................ | 429/94 |
| 6,106,975 | * 8/2000 | Watanabe et al. ..................... | 429/211 |
| 6,114,059 | * 9/2000 | Watanabe et al. ..................... | 429/120 |
| 6,117,584 | * 9/2000 | Hoffman et al. ....................... | 429/120 |
| 6,117,589 | * 9/2000 | Satou et al. ............................ | 429/211 |

FOREIGN PATENT DOCUMENTS

| | | |
|---|---|---|
| 0 822 605 | 2/1998 | (EP) . |
| 0 917 227 | 5/1999 | (EP) . |
| 10 261439 | 9/1998 | (JP) . |
| 99 17391 | 4/1999 | (WO) . |

* cited by examiner

Primary Examiner—Tom Dunn
Assistant Examiner—Zidia Pittman
(74) Attorney, Agent, or Firm—Burr & Brown

(57) ABSTRACT

A lithium secondary battery includes: an internal electrode body including a positive electrode, a negative electrode, and a separator, the positive electrode and the negative electrode being wound via the separator so that the positive electrode and the negative electrode are not brought into direct contact with each other, and an organic electrolyte. An average current collecting area obtained by dividing a positive electrode area (cm$^2$) by the number of current-collecting tabs to be attached to the positive and negative electrodes is 360 or less.

12 Claims, 2 Drawing Sheets

LITHIUM SECONDARY BATTERY

BACKGROUND OF THE INVENTION AND RELATED ART STATEMENT

The present invention relates to a lithium secondary battery which is suitably used for driving a motor of particularly an electric vehicle or the like. More particularly, the present invention relates to a lithium secondary battery in which internal resistance is reduced by clarifying a correlation between a form and the like of an internal electrode body and conditions for attaching current collecting tabs and which gives a good charge-discharge property, high output, and high current.

In recent years, while it is eagerly desired to regulate the emission of exhaust gas including carbon dioxide and other harmful substances with the elevation of environment protection campaigns as a background, in the automobile industry, in replacement of automobiles using fossil fuels, such as a vehicle driven by gasoline, the campaign to promote introduction of an electric vehicle (EV) and a hybrid electric vehicle (HEV) has become active.

A lithium secondary battery as a motor-driving battery in EV and HEV is required to have such characteristics as large battery capacity and high battery output to obtain predetermined accelerating ability, gradability and, continuous running ability. For example, in the case of HEV, since a motor is in a mode of assisting the output upon acceleration, the battery which drives the motor is required to have a high output. Therefore, a lithium secondary battery having high energy density is said to be the most preferable one as a battery for driving a motor. However, a voltage per a unit battery depends on the material forming the battery. Since a lithium secondary battery has a voltage of at most about 4.2V, a large output means a large current flow.

Since a plurality of batteries are connected in series to secure a voltage required to drive a motor, the same amount of current flows in each of the batteries. Indeed, in HEV or the like, a current of 100 A or higher often flows. In order to realize such a high output property and a high current property, it is important to reduce an internal resistance of a battery as much as possible.

In the aforementioned lithium secondary battery for HEV or the like, an electrode area in an internal electrode body is naturally large because a battery capacity per unit battery is large. Here, a current collecting tab which connects an internal electrode body with a current extracting terminal plays an important role in taking current effectively out of a battery having a large electrode area. That is, a high resistance of the current collecting tab causes a problem of high energy loss at the time of charging-discharging or melting of the tab.

It can be easily considered that the whole resistance of current correcting tabs can be reduced if the number of the current correcting tabs to be attached is increased. However, this case brings about a difficulty in an operation of attaching all the current correcting tabs to one portion collectively in a process of manufacturing a battery.

On the other hand, in an internal electrode body, a length (length in a winding-axial direction of an electroactive material layer) and a width (width of the electroactive material) of an electrode can be varied, and it is not natural that the number of current collecting tabs should be fixed in various kinds of batteries having various battery capacities. Nevertheless, influence of a relation between length or width of electrode or battery capacity and the number of current collecting tabs on an internal resistance of a battery has not been clarified.

SUMMARY OF THE INVENTION

The present invention has been made in view of the aforementioned problems of the prior art and aims to reduce an internal resistance by clarifying influence of correlation between conditions for attaching current collecting tab and shape, or the like, of the other members constituting the battery on the internal resistance, to determine manufacturing conditions by which variance in properties of batteries is suppressed, and to provide a parameter which can be a guideline for designing a battery.

That is, according to the invention, there is provided a lithium secondary battery, comprising:

an internal electrode body including a positive electrode, a negative electrode, and a separator, the positive electrode and the negative electrode being wound via the separator so that the positive electrode and the negative electrode are not brought into direct contact with each other, and an organic electrolyte;

wherein an average current collecting area obtained by dividing a positive electrode area ($cm^2$) by the number of current-collecting tabs to be attached to the positive and negative electrodes is 360 or less.

According to the present invention, there is further provided a lithium secondary battery, comprising:

an internal electrode body including a positive electrode, a negative electrode, and a separator, the positive electrode and the negative electrode being wound via the separator so that the positive electrode and the negative electrode are not brought into direct contact with each other, and an organic electrolyte;

wherein a value (hereinbelow referred to as tab/width ratio) obtained by dividing the number of current collecting tabs to be attached to the positive and negative electrodes by a width(mm) of the positive electrode is 0.1 or more.

According to the present invention, there is furthermore provided a lithium secondary battery, comprising:

an internal electrode body including a positive electrode, a negative electrode, and a separator, the positive electrode and the negative electrode being wound via the separator so that the positive electrode and the negative electrode are not brought into direct contact with each other, and an organic electrolyte;

wherein a value (hereinbelow referred to as tab/capacity ratio) obtained by dividing the number of current collecting tabs to be attached to the positive and negative electrodes by a battery capacity (Ah) is 1.0 or more.

In a lithium secondary battery of the present invention as described above, it is preferable that the current correcting tabs are attached to the positive and negative electrodes at an average interval of not less than twice a width of the current correcting tabs. Such a constitution of a lithium secondary battery is preferably applied to a battery having a capacity of not less than 5 Ah. The battery is preferably used for an electric vehicle or a hybrid electric vehicle.

DETAILED DESCRIPTION OF THE INVENTION

Figure 1:
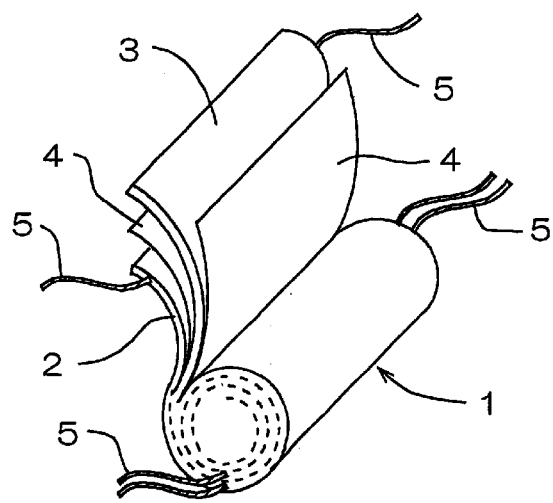
FIG. 1 is a perspective view showing a structure of a winding-type internal electrode body.

An internal electrode body of a lithium secondary battery (hereinbelow referred to as "battery") in the present invention is constituted by winding a positive electrode and a negative electrode via a separator of porous polymer film so that the positive electrode and the negative electrode are not brought into direct contact with each other. Specifically, as shown in FIG. 1, an internal electrode body 1 is formed by winding a positive electrode 2 and a negative electrode 3 via a separator 4, and each of the positive and negative electrodes 2 and 3 is provided with current collecting tabs 5.

The electrodes 2, 3 are produced by forming an electroactive material layer by applying an electroactive material on the both surfaces of aluminum foil, titanium foil or the like for the positive electrode 2 and of copper foil, nickel foil or the like for the negative electrode 3 as an electrode substrate (current collecting body). Though the positive electrode 2 and the negative electrode 3 to be used in the same battery have the same width, the positive electrode 2 generally has a shorter length (length in a winding direction) than the negative electrode 3 so that the negative electrode 3 covers the positive electrode 2 in a peripheral portion of the internal electrode body A tab 5 is disposed on a side of each piece of such foil and can be attached by a means such as supersonic welding when the electrodes 2 and 3 are wound with the separator 4. A material for the tab 5 is often the same as that of the foil to which the tab 5 is attached. The tab 5 has a thin strip shape so that the portion where the tab 5 of the electrodes 2, 3 is attached may not swell to the direction of a periphery when the internal electrode body 1 was formed.

The end portion opposite to the end portion where the tab 5 is connected with the electrodes 2 and 3 is attached to an external terminal or an internal terminal which is disposed inside the battery and which is conductive to the external terminal. It is preferable that the tabs 5 are disposed at a regular intervals so that a tab 5 can collect current from a certain area in the electrodes 2, 3.

Though a positive electroactive material to be used for manufacturing the positive electrode 2 is not particularly limited, there is preferably used a lithium transition metal compound oxide such as lithium cobalt oxide($LiCoO_2$), lithium nickel oxide($LiNiO_2$), lithium manganese oxide ($LiMn_2O_4$), or the like. It is also preferable to mix with the electroactive material a carbon powder such as acetylene black, graphite powder, or the like, so as to improve conductivity of the positive electroactive material.

On the other hand, for the negative electroactive material, an amorphous carbon material such as soft carbon or hard carbon, or carbon powder such as artificial graphite, natural graphite or the like is used. These electroactive materials are slurried, coated onto both surfaces of the electrode substrate and stuck and, thus the electrodes 2, 3 are produced.

As the separator 4, it is preferable to use one having a three-layer structure in which a polyethylene film having lithium ion permeability and including micropores is sandwiched between porous polypropylene films having lithium ion permeability. This serves also as a safety mechanism in which when a temperature of the internal electrode body 1 is raised, the polyethylene film is softened at about 130° C. so that the micropores are collapsed to suppress the movement of lithium ions, that is, the battery reaction. And, since this polyethylene film is sandwiched between the polypropylene films having a softening temperature higher than the said polyethylene film, it becomes possible to prevent the direct contact between the electrodes 2, 3.

As the electrolyte, one or more kinds of lithium fluoride complex compound such as $LiPF_6$, and $LiBF_4$, etc. or lithium halide such as $LiClO_4$ dissolved in a single solvent or mixed solvent of organic solvents such as a carbonate family such as ethylene carbonate (EC), propylene carbonate (PC), diethyl carbonate (DEC), dimethyl carbonate (DMC), γ-butyrolactone, tetrahydrofuran, and acetonitrile are preferably used. Such an electrolyte is filled in a battery case with the internal electrode body 1 being immersed with the electrolyte.

In the present invention, correlation between a positive electrode area, width of a positive electrode, or a battery capacity and the number of tabs to be attached was conceived, and there were produced a battery having a positive electrode having a width of 100 mm and an external form of 50 mmφ×140 mm and a battery having a positive electrode having a width of 200 mm and an external form of 50 mmφ×240 mm with a material shown in Table 1 by varying the number of tabs to be attached in a longitudinal direction of a positive electrode, i.e. varying the average interval of tabs (hereinbelow referred to as "tab pitch", which is a distance between the centers of two adjacent tabs.

TABLE 1

| | Material | Thickness(μm) | Length(mm) | Width(mm) |
|---|---|---|---|---|
| Current-collecting body for positive electrode | Aluminum | 20 | 3600 | 110 or 210 |
| Current-collecting body for negative electrode | Copper | 10 | 4000 | 110 or 210 |
| Current-collecting tab for positive electrode | Aluminum | 20 | 50 | 8 |
| Current-collecting tab for negative electrode | Copper | 10 | 50 | 8 |
| Positive electroactive material layer | $LiMn_2O_4$ | one side: 100 | 3600 | 100 or 200 |
| Negative electroactive material layer | Highly graphitized carbon material (Highly graphitized | one side: 80 | 4000 | 100 or 200 |

TABLE 1-continued

|  | Material | Thickness(μm) | Length(mm) | Width(mm) |
| --- | --- | --- | --- | --- |
|  | carbon fiber) |  |  |  |
| Separator | PP/PE/PP | 25 | 4500 | 120 or 220 |
|  | Microporous separator |  |  |  |
| Electrolyte | LiPF$_6$ | — | — | — |
| Solvent for electrolytic solution | EC + DEC mixed solvent | — | — | — |

Here, a width of a positive electrode denotes a width of a positive electroactive material layer, which is equal to a width of a negative electroactive material layer in a negative electrode, i.e., a width of a negative electrode. On the other hand, a length of a positive electrode denotes a length of a positive electroactive material layer in a winding direction. The reason why a length of a positive electrode is used here is that the positive electrode is shorter than the negative electrode (in a winding direction of a negative electroactive material layer) and that it was considered that a battery capacity depends on an amount of positive electroactive material, i.e., a battery capacity depends on a length of a positive electrode for an electrode having an electroactive material layer and having a fixed thickness. Therefore, an electrode area is also based on a positive electrode area.

Incidentally, tab pitch (the number of tabs) was common to the positive and negative electrodes in a battery. With regard to production of an internal electrode body, a negative electrode was wound first, and after winding up a positive electrode, the negative electrode was wound one round so as to completely cover the positive electrode. Any tab was not provided at the start and end of winding of a portion, which does not face the negative electrode, of the negative electrode.

Table 2 shows a battery capacity, length and width of a positive electrode, conditions of attaching tabs, a parameter obtained from these various design values and the results of measuring internal resistance of a battery. The battery capacity was obtained by charging with constant current at 1C (rate)—constant voltage (4.1V) charge and discharging by constant current discharge at 1C to cutoff—voltage of 2.5V. The internal resistance was obtained by dividing a difference between a voltage value in a condition of rest of operation after the charge was finished and a voltage value right after the discharge started by a discharge current value.

TABLE 2

| Sample number | Battery capacity A (Ah) | Length of positive electrode B (mm) | Width of positive electrode C (mm) | Number of tabs to be attached D | Tab pitch B/D (mm) | Average cullent-correcting area BxC/D (cm$^2$/piece) | Number of tabs/Width of positive electrode D/C (pieces/mm) | Number of tabs/Battery capacity D/A (pieces/Ah) | Internal resistance (mΩ) |
| --- | --- | --- | --- | --- | --- | --- | --- | --- | --- |
| 1 | 20 | 3600 | 200 | 10 | 360 | 720 | 0.050 | 0.50 | 5.75 |
| 2 | 20 | 3600 | 200 | 15 | 240 | 480 | 0.075 | 0.75 | 3.58 |
| 3 | 20 | 3600 | 200 | 20 | 180 | 360 | 0.100 | 1.00 | 2.36 |
| 4 | 20 | 3600 | 200 | 24 | 150 | 300 | 0.120 | 1.20 | 2.09 |
| 5 | 20 | 3600 | 200 | 30 | 120 | 240 | 0.150 | 1.50 | 1.90 |
| 6 | 20 | 3600 | 200 | 45 | 80 | 160 | 0.225 | 2.25 | 1.55 |
| 7 | 20 | 3600 | 200 | 60 | 60 | 120 | 0.300 | 3.00 | 1.39 |
| 8 | 20 | 3600 | 200 | 90 | 40 | 80 | 0.450 | 4.50 | 1.29 |
| 9 | 10 | 3600 | 100 | 5 | 720 | 720 | 0.050 | 0.50 | 20.94 |
| 10 | 10 | 3600 | 100 | 10 | 360 | 360 | 0.100 | 1.00 | 7.50 |
| 11 | 10 | 3600 | 100 | 15 | 240 | 240 | 0.150 | 1.50 | 5.03 |
| 12 | 10 | 3600 | 100 | 20 | 180 | 180 | 0.200 | 2.00 | 3.95 |
| 13 | 10 | 3600 | 100 | 24 | 150 | 150 | 0.240 | 2.40 | 3.48 |
| 14 | 10 | 3600 | 100 | 30 | 120 | 120 | 0.300 | 3.00 | 3.08 |
| 15 | 10 | 3600 | 100 | 45 | 80 | 80 | 0.450 | 4.50 | 2.61 |

Figure 2:
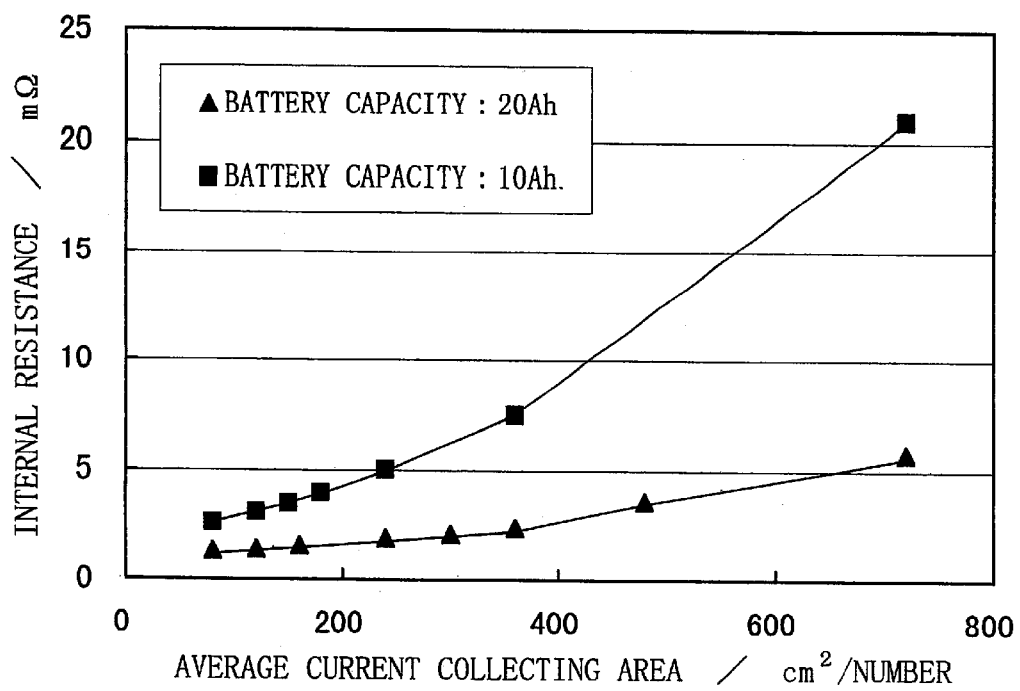
FIG. 2 is a graph showing a correlation between value (average current collecting area) obtained by dividing a positive electrode area by the number of current-collecting tabs to be attached and internal resistance.

FIG. 2 is a graph showing a correlation between internal resistance and average current-collecting area, which is obtained by a positive electrode area divided by the number of tabs to be attached. The average current-collecting area means an average area which one tab takes charge of current collecting at the positive electrode. Since a positive electrode area can be set to be constant even if a length and/or a width is changed, an average current-collecting area can be considered as a parameter which is independent from a form (length or width of positive electrode) so as to prescribe an internal resistance.

In FIG. 2, an internal resistance does not have a large change when an average current-collecting area is 360 (cm$^2$/tab) or less. The value itself is suppressed to be small in a battery produced under the same conditions except for the number of tabs to be attached. When an average current-collecting area exceeds 360 (cm$^2$/tab), an internal resistance becomes large abruptly.

Since a large average current-collecting area means the small number of tabs to be attached, a total resistance of tabs in a whole battery becomes large. In the case that the same current flows through tabs having a large average current-collecting area and a small average current-collecting area in such conditions, when an average current-collecting area is large, a drop in voltage becomes large because a current flowing through each tab becomes large, and uneven current flow on the surface of the electrode is caused because current flows in tabs from an electrode having a large area. Thus, it is considered that an internal resistance, depending on an average current-collecting area, causes a sudden change at a certain value.

Figure 3:
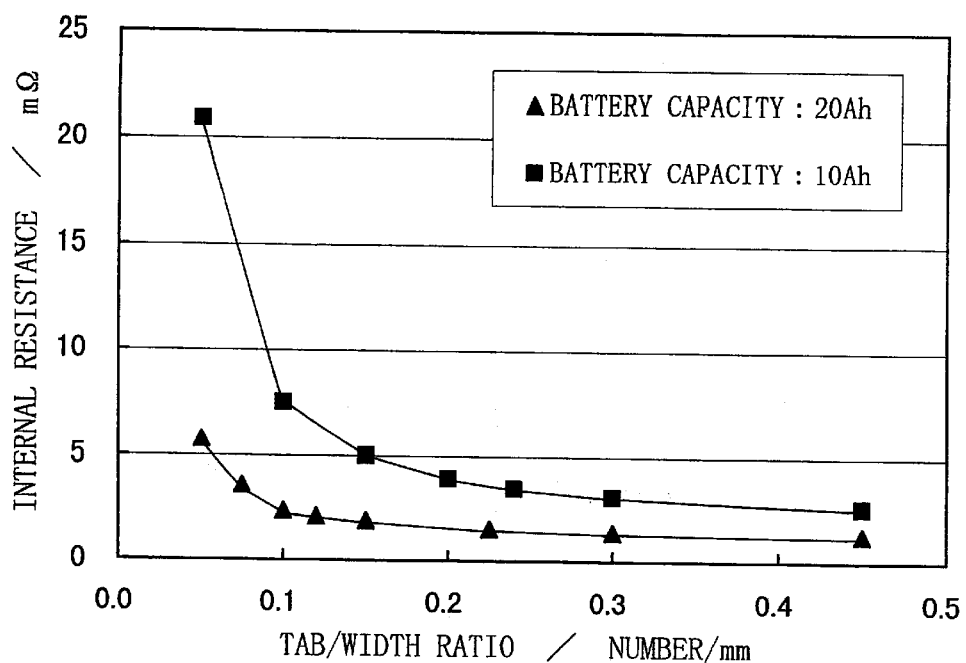
FIG. 3 is a graph showing a correlation between value (tab/width ratio) obtained by dividing the number of current collecting tabs to be attached by a width of the positive electrode and internal resistance.

FIG. 3 is a graph showing a correlation between an internal resistance and a value (tab/width ratio) obtained by dividing the number of tabs to be attached by a width of a positive electrode. When a length of a positive electrode is fixed, if the tabs have various widths, a positive electrode area (average current-collecting area) which one tab takes in charge of is increased, which appears to lead to an increase in internal resistance. Further, since a change of width of a positive electrode means a change of length between the side where the tabs are attached and the other side, it can be considered that an internal resistance is changed due to uneven current distribution and uneven battery reaction caused in a direction of width. That is, the tab/width ratio is a parameter showing the number of tabs required by unit length of a positive electrode in a direction of width of the positive electrode. In FIG. 3, if the tab/width ratio is 0.1 (tabs/mm) or more, an internal resistance does not have a large change, and a value of internal resistance itself can be set within a small range.

Figure 4:
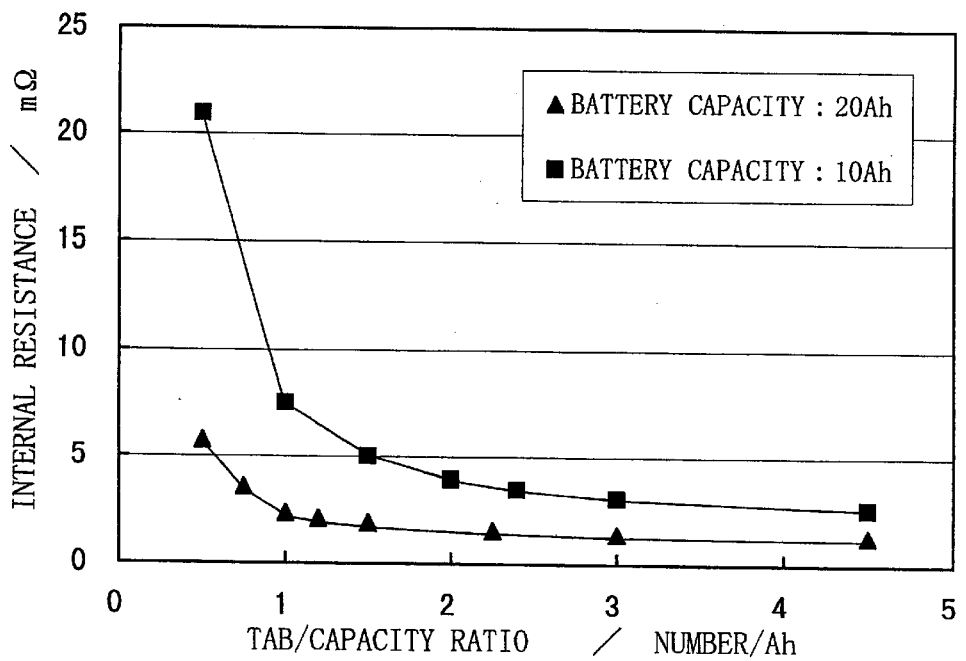
FIG. 4 is a graph showing a correlation between value (tab/capacity ratio) obtained by dividing the number of current collecting tabs to be attached by a battery capacity and internal resistance.

FIG. 4 is a graph showing a correlation between an internal resistance and a value (tab/capacity ratio) obtained by dividing the number of tabs by a battery capacity. As mentioned above, an area from which one tab collects current should be a certain area or less. However, a battery capacity increases according as a positive electrode area. On the other hand, if the number of tabs is different, an internal resistance changes due to a change of resistance of tabs even if a battery capacity is the same. Therefore, ensuring at least a certain amount of current being able to flow through a tab means reduction of an internal resistance, thereby making uniform a current flow in an internal electrode body, and leads to reduction of resistance in an internal electrode body. From this view point and FIG. 4, it can be understood that a tab/capacity ratio, which is a parameter showing the number of tabs per unit capacity, is preferably 1.0 or more.

The lower limit of the aforementioned tab/width ratio and the upper limits of a tab/width ratio and a tab/capacity ratio are determined in consideration of easiness in practical manufacturing of a battery and reality. For example, the side where tabs are attached is completely covered by the tabs in the case that a tab pitch is not larger than a width of a tab. This corresponds to the case that a width of a current-collecting body of an electrode is extended, which is not realistic in producing a battery. Therefore, it is preferable that a tab pitch is at least twice the width of a tab.

The aforementioned various parameters were obtained with fixing thicknesses of an electroactive material layer and a current-collecting body. If a thickness of an electroactive material layer is different, a battery capacity correspondingly changes. Therefore, it is needless to say that a tab/capacity ratio does not depend to a thickness of an electroactive material layer, or the like. In a correlation between an internal resistance and a tab/width ratio, it can be easily presumed that, even if the absolute value of the internal resistance is changed by a change of a thickness of the electroactive material layer or the like, the state of the change is not influenced by the thickness of the electroactive material layer or the like. In short, various kinds of rates defined in the present invention are parameters not depending on the conditions for producing a battery, and therefore can be applied to batteries besides a battery having a constitution shown in Table 1 and Table 2.

Further, it is needless to say that units of the aforementioned parameters can be used after being converted into other units of the same dimension. Also, it is needless to say that the units of the aforementioned parameters are units which are preferable to be used in producing a battery or which are realistic.

The constitution of the lithium secondary battery of the present invention mentioned above is suitably applied to a battery having a large battery capacity of at least 5 Ah. In that case, an effect of reduction of an internal resistance is remarkably shown. However, it is needless to say that the constitution may be used for a battery having a battery capacity of less than 5 Ah.

Thus, large current can be discharged without any problem due to a small internal resistance. Therefore, a lithium secondary battery of the present invention can be suitably used for an electric vehicle (EV) or a hybrid electric vehicle (HEV).

As described above, according to a lithium secondary battery of the present invention, since current-collecting tabs are provided under conditions appropriate for a form of an electrode of a battery capacity, it is possible to provide a battery which has a small internal resistance and stable properties in which variance in properties of each battery is suppressed with regard to production. Therefore, since large current can be discharged without any problem, and an energy loss during charge and discharge can be reduced even if the battery is used for EV or HEV, the battery has an excellent effect in improving charge-discharge cycle properties.

What is claimed is:

1. A lithium secondary battery, comprising:
    an internal electrode body including a positive electrode, a negative electrode, and a separator, the positive electrode and the negative electrode being wound via the separator so that the positive electrode and the negative electrode are not brought into direct contact with each other, and
    an organic electrolyte;
    wherein an average current collecting area obtained by dividing a positive electrode area ($cm^2$) by the sum of the number of current-collecting tabs attached to the positive electrode and the number of current-collecting tabs attached to the negative electrode is 360 or less.

2. A lithium secondary battery, comprising:
    an internal electrode body including a positive electrode, a negative electrode, and a separator, the positive electrode and the negative electrode being wound via the separator so that the positive electrode and the negative electrode are not brought into direct contact with each other, and
    an organic electrolyte;
    wherein a value (tab/width ratio) obtained by dividing the sum of the number of current-collecting tabs attached to the positive electrode and the number of current-collecting tabs attached to the negative electrode by a width (mm) of the positive electrode is 0.1 or more.

3. A lithium secondary battery, comprising:
    an internal electrode body including a positive electrode, a negative electrode, and a separator, the positive electrode and the negative electrode being wound via the separator so that the positive electrode and the negative electrode are not brought into direct contact with each other, and
    an organic electrolyte;
    wherein a value (tab/capacity ratio) obtained by dividing the sum of the number of current-collecting tabs attached to the positive electrode and the number of current-collecting tabs attached to the negative electrode by a battery capacity (Ah) is 1.0 or more.

4. A lithium secondary battery according to claim 1, wherein the current collecting tabs are attached to the positive and negative electrodes at an average interval of not less than twice a width of the current correcting tabs.

5. A lithium secondary battery according to claim 2, wherein the current correcting tabs are attached to the positive and negative electrodes at an average intervals of not less than twice a width of the current correcting tabs.

6. A lithium secondary battery according to claim 3, wherein the current collecting tabs are attached to the positive and negative electrodes at an average intervals of not less than twice a width of the current correcting tabs.

7. A lithium secondary battery according to claim 1, wherein the battery has a capacity of not less than 5 Ah.

8. A lithium secondary battery according to claim 2, wherein the battery has a capacity of not less than 5 Ah.

9. A lithium secondary battery according to claim 3, wherein the battery has a capacity of not less than 5 Ah.

10. A hybrid electric vehicle or an electric vehicle, comprising a lithium secondary battery according to claim 1.

11. A hybrid electric vehicle or an electric vehicle, comprising a lithium secondary battery according to claim 2.

12. A hybrid electric vehicle or an electric vehicle, comprising a lithium secondary battery according to claim 3.

* * * * *